(12) United States Patent
Simeray

(10) Patent No.: US 6,471,565 B2
(45) Date of Patent: Oct. 29, 2002

(54) INTERACTIVE TOY

(75) Inventor: Janick Simeray, Colombes (FR)

(73) Assignee: Groupe Berchet, Oyonnax (FR)

( * ) Notice: Subject to any disclaimer, the term of this patent is extended or adjusted under 35 U.S.C. 154(b) by 31 days.

(21) Appl. No.: 09/924,810

(22) Filed: Aug. 8, 2001

(65) Prior Publication Data

US 2001/0053650 A1 Dec. 20, 2001

Related U.S. Application Data

(63) Continuation of application No. PCT/FR00/00321, filed on Feb. 10, 2000.

(30) Foreign Application Priority Data

Feb. 19, 1999 (FR) ............................................. 99 02055

(51) Int. Cl.$^7$ ................................................. A63H 3/28
(52) U.S. Cl. ...................... 446/298; 446/297; 446/304; 446/476; 446/268; 446/129; 446/130; 340/10.1
(58) Field of Search ................................ 446/297, 298, 446/299, 300, 301, 302, 303, 175, 304, 478, 476, 487, 268; 340/10.1, 10.2, 10.3, 10.4, 10.5, 10.6

(56) References Cited

U.S. PATENT DOCUMENTS

| | | | | |
|---|---|---|---|---|
| 1,573,190 A | * | 2/1926 | Raizen | 446/482 |
| 3,849,930 A | * | 11/1974 | Stubbmann | 446/476 |
| 4,348,191 A | * | 9/1982 | Lipsitz et al. | 446/297 |
| 4,484,408 A | * | 11/1984 | Fogarty et al. | 446/299 |
| 4,820,233 A | * | 4/1989 | Weiner | 446/397 |
| 4,869,701 A | * | 9/1989 | Kawai et al. | 273/156 |
| 5,004,445 A | * | 4/1991 | Coleman et al. | 446/478 |
| 5,217,402 A | * | 6/1993 | Gross et al. | 446/397 |
| 5,290,198 A | * | 3/1994 | Nakayama | 446/297 |
| 5,607,336 A | * | 3/1997 | Lebensfeld et al. | 446/297 |
| 5,661,470 A | | 8/1997 | Karr | 340/825.54 |
| 5,766,077 A | * | 6/1998 | Hongo | 273/148 B |
| 5,864,288 A | * | 1/1999 | Hogan | 446/297 |
| 6,257,948 B1 | * | 7/2001 | Silva | 446/100 |
| 6,290,565 B1 | * | 9/2001 | Galyean, III et al. | 273/148 B |

FOREIGN PATENT DOCUMENTS

FR 2 297 066 8/1976

* cited by examiner

Primary Examiner—Derris H. Banks
Assistant Examiner—Urszula M Cegielnik
(74) Attorney, Agent, or Firm—Heslin Rothenberg Farley & Mesiti P.C.

(57) ABSTRACT

A toy includes a toy proper and accessories. The toy proper includes a processing unit having a microprocessor or a microcontroller incorporated therein. An autonomous electrical supply supplies the processing unit with electrical energy. An assembly of at least one of a sensor and an actuator connected to the processing unit carries out at least one type of function. An inductive coupler is connected to the processing unit. The accessories associated with the toy proper each include at least one inductive label for interacting electromagnetically with the inductive coupler so that a current of defined frequency flows through said at least one inductive coupler connected to said at least one processing unit and said inductive coupler exchanges with said inductive labels binary data corresponding to phase or amplitude states of the frequency modulation.

10 Claims, 2 Drawing Sheets

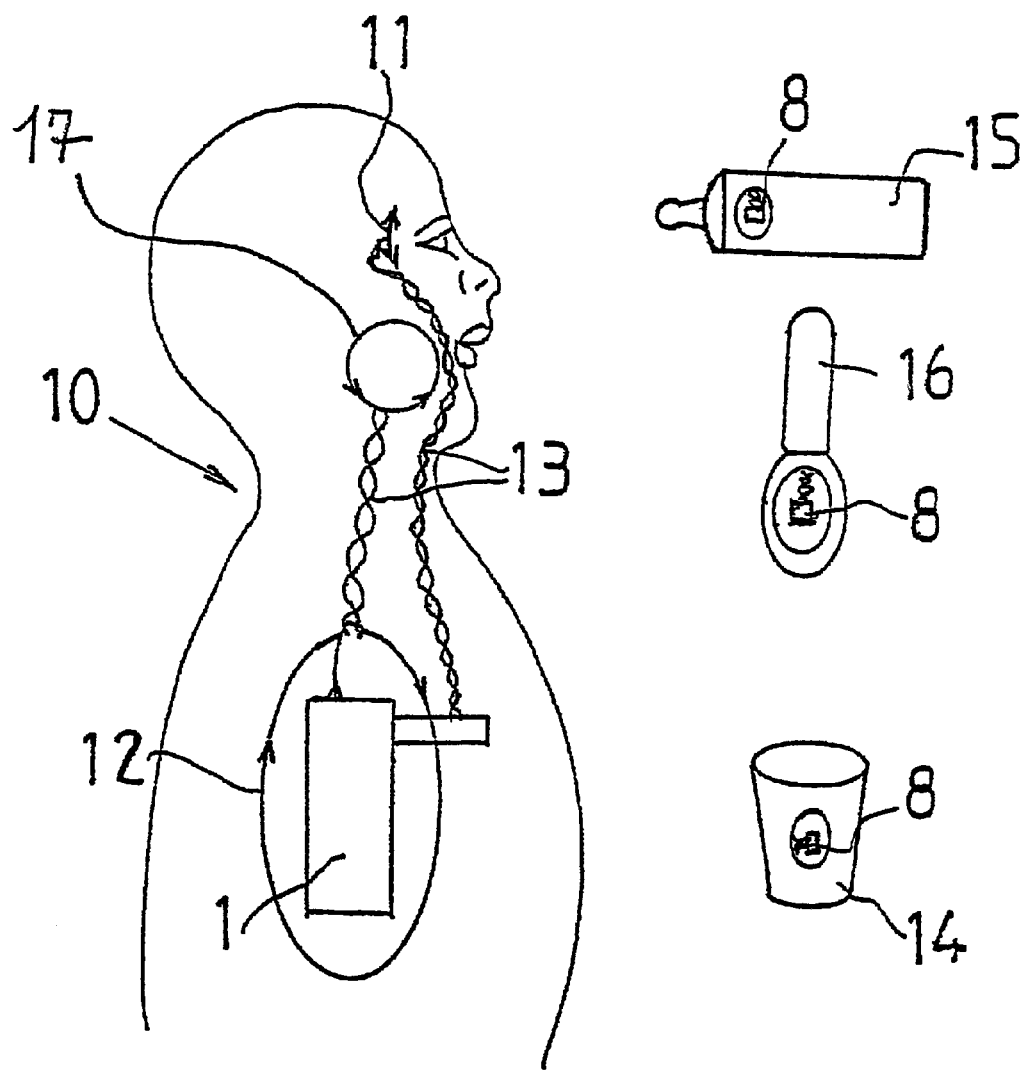

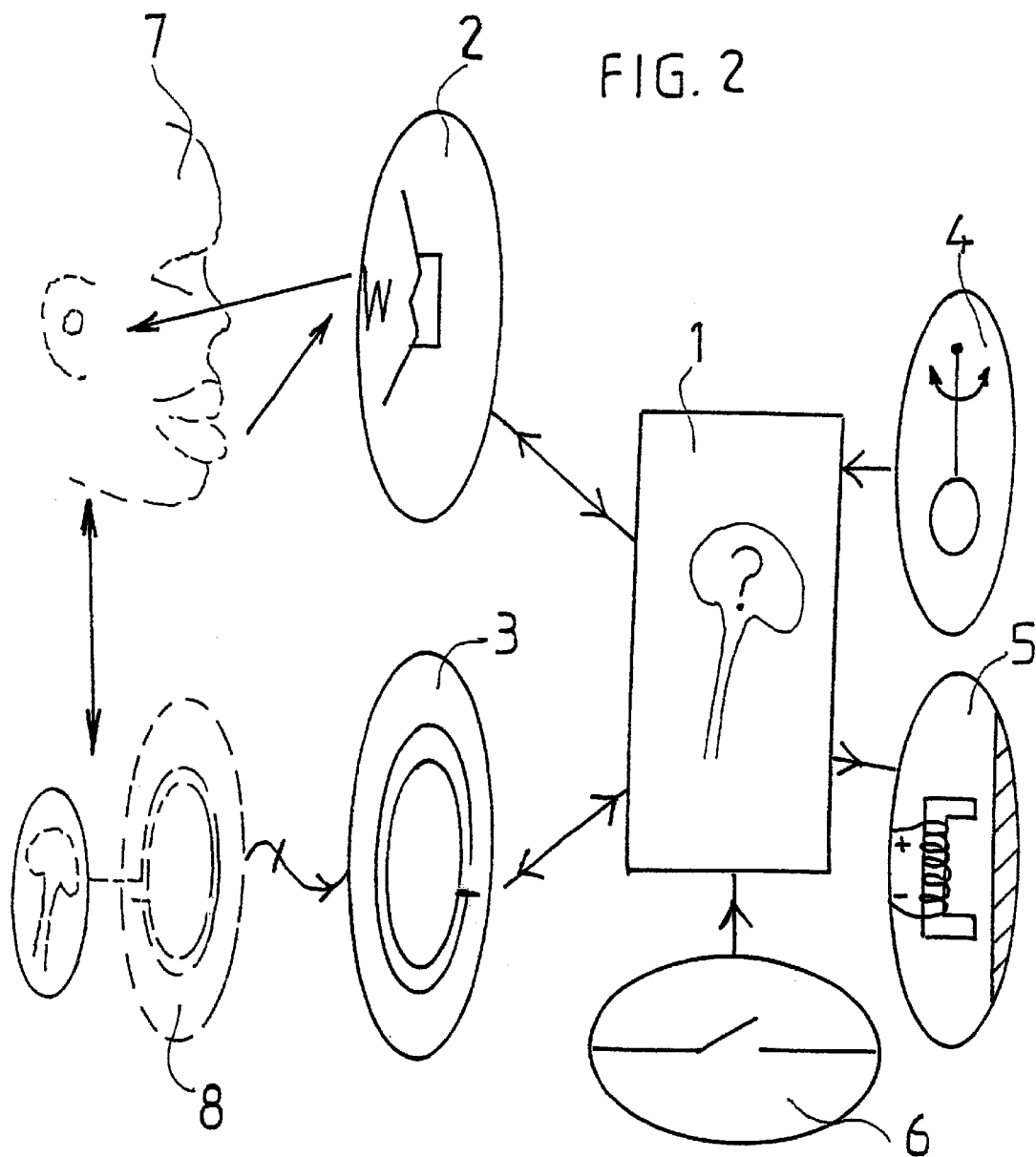

INTERACTIVE TOY

Cross Reference to Related Applications

This application is a continuation of copending PCT application PCT/FR00/00321, filed Feb. 10, 2000, designating the United States and claiming priority from French application FR 99.02055, filed Feb. 19, 1999. The priorities of both applications are claimed herein, and the entire disclosures of both applications are incorporated herein by reference.

The invention relates to an intelligent and auto-adaptive toy capable of interacting with accessories which are associated with it and are actuated by a child.

This toy incorporates electronics allowing this interaction.

The development of the electronics and their incorporation into toys allow a wide variety and high degree of sophistication of proposed functions.

Thus, in addition to sound defects, motorization and remote control, all widely used at the present time, toys also incorporate artificial pseudo-intelligence such as in the toy known under the trademark "TAMAGOCHI", the screen of which represents a character simulating a living being.

Document FR-A-2 297 066 describes a toy, capable of interacting with varied accessories. These accessories are provided with a magnet, which magnetic field is intended to close a REED relay integraded in the toy, and leading then to an electronic or electromecanic function. This technology does not allow recognation nor identification of accessories.

Document US-A-5 661 470 discloses a system of recognation of accessories. This system implements resonators, integrated within said accessories, and capable of getting into resonance when it lies within the frequency field of a reader, scanning the appropriated frequency range. However, while indeed this technology is a improvement in view of the preceeding one, it does not allow to implement an important amount of accessories, and further does not permit the exchange of information.

The present invention relates to the use of a particular and novel electronic architecture intended for equipping a range of toys and their accessories, having intelligent, interactive and auto-adaptive functions, possibly simulating a living being.

According to the invention, the toys equipped with this electronic architecture do not have the conventional technological interface formed by a screen and a keyboard.

They interact directly with the child via sensors and actuators controlled by a central computing unit incorporated into the toy.

Of course, the invention relates to any type of toy capable of incorporating such electronics, and especially to toys with accessories, imitating toys and toys used to set up a particular situation.

Among these, mention may more particularly be made of dolls and their ranges of clothes, fixed or movable furniture, toilet accessories, kitchen accessories, nappies, etc.

Within the same concept, mention may also be made of children's kitchens with a full set of crockery, children's workbenches or workshops with a panoply of tools and circuits, garages with a fleet of vehicles, scenery with a range of characters, etc.

Of course, these examples in no way limit the scope of the present invention.

According to the invention, this toy comprises a toy proper associated with a range of accessories and includes one or more central processing units, comprising a microprocessor or microcontroller, incorporated into the toy proper;

an autonomous electrical supply intended to supply said central processing unit or units with electrical energy;

an assembly of one or more sensors and/or actuators connected to interfaces integrated into the central processing unit or units and intended to carry out functions of various types;

at least one inductive coupler connected to at least one central processing unit.

According to the invention the accessories associated with the toy each include at least one inductive label intended to interact electromagnetically with said inductive coupler;

flowing through the inductive coupler connected to the central processing unit is a current of defined frequency and the inductive coupler exchanges with said inductive labels binary data corresponding to phase or amplitude states of the frequency modulation.

According to an advantageous characteristic of the invention, the central processing unit includes a device for the multiple recognition and identification of information, and does so in such a way as to allow sequential or simultaneous reading of several inductive labels lying within the reading field of the inductive coupler.

According to another advantageous characteristic of the invention, the central processing unit includes a device for the recognition and identification of information, in such a way as to allow binary and/or hexadecimal information to be written into one or more inductive labels lying within the reading field of the inductive coupler.

The manner in which the invention may be realized and the advantages which stem therefrom will emerge more clearly from the illustrative example which is given by way of indication but implying no limitation, supported by the appended figures.

FIG. 1 is a schematic representation of the implementation of the principle applied to representing a baby.

FIG. 2 is a schematic representation of the interaction between the central processing unit and the accessories.

Shown schematically in FIG. 1 is a baby doll (10), which incorporates at least one central processing unit (1). Advantageously, it comprises two central processing units, respectively one more specifically dedicated to manage the reading of the signals and the other more especially dedicated to managing the sound when the baby (and in general when the toy) is actually provided with a sound-part.

Physically represented near one of the two eyes is an electromagnet (11) intended to actuate the opening or closing of the eyes. This electomagnet is connected by a wire link (13) to the central processing unit (1).

Moreover, this figure shows two closed loops (12) and (17), respectively in the trunk and in the mouth of the baby, and inductive couplers, also connected by wire link to the central processing unit (1). These couplers, in which an electric current of defined frequency flows, are intended to interact, and especially exchange data, with inductive labels positioned within accessories, such as a glass (14), a baby's bottle (15) or a spoon (16). As may be seen in FIG. 1, each of these accessories is provided with an inductive label, physically represented by a closed loop (17).

FIG. 2 shows the interaction between the central processing unit (1) and the various sensors, actuators or couplers of the invention.

This central processing unit (1) basically incorporates an active digital integrated circuit and more particularly a microcontroller or microprocessor, provided with all the conventional functions, namely the memory function, the clock function and the function of interfacing with sensors and actuators.

According to the invention, the central processing unit (1) is controlled by software which defines the functions in terms of behaviour and of the interactions of the toy into which this central processing unit (1) is incorporated.

This software is implanted in the memories associated with the central processing unit (these not being shown).

According to the invention, the electronics are autonomous and include their own energy source. This source typically consists of a rechargeable battery or a cell, also not shown.

According to the invention, the electronics include a range of sensors, the two main types of which are as follows:
one or more switch-type contactors (6);
one or more gravimetric attitude sensors (4).

Of course, it is possible to incorporate one or more other sensors such as, for example, photo-diodes, capable of perceiving visible light or infra-red signals.

It may also incorporate other communication interfaces, namely optical ones, implementing lightemitting diodes (LEDs) capable of emitting in the visible or infrared range.

According to the invention, the electronics include a single type of actuator (5) of the electromagnetic type, such as one or more electromagnets or motors.

Finally, according to another feature of the invention, the electronic circuit of the central processing unit (1) comprises a combination of two communication interfaces:

a first interface, of the sound type, comprising a microphone and a loudspeaker (2); optionally, the microphone and the loudspeaker may be incorporated into a single two-way transducer; this sound interface acts within the child portrayed by the reference (7), reproducing a certain number of sounds, words or musical notes, depending on the software associated with the central processing unit (1); this interface reacts to the child, to his words and to the noises he makes. Depending on the degree of sophistication of the software, the interface thus allows discrimination of voice tone maturity, voice identification or even lexical or grammatical recognition;

the second communication interface is of inductive type. It is an inductive coupler (3, 12, 13) in the form of a coil or of a loop through which a current of defined frequency flows.

According to the invention, the central processing unit (1) is connected to at least one inductive coupler (3), the positioning of which, inside the toy proper, will depend on the type of interaction desired, and especially on t-he range of accessories with which it is intended to interact.

This coupler is intended to interact with passive or active inductive labels (8), that is to say those which are autonomous or not containing any energy source proper. These labels are fastened to the complementary accessories of the toy proper, as already mentioned in conjunction with the description of FIG. 1.

The interaction with the inductive label takes place in the form of an exchange of binary data—0 and 1—corresponding to phase or amplitude states of the frequency modulation.

Physically, it is carried out by weak inductive coupling between the coil or the loop of the sensor (3) and the loop or the coil of the label (8).

The inductive label consists of a loop or coil connected to an active digital integrated circuit, more usually called a "chip", and for example consisting of a microcontroller possibly associated with a miniature battery.

According to the invention, each accessory includes at least one inductive label.

The interactions and links between the various constituent elements of the toy and of the accessories according to the invention will now be described in greater detail.

The microprocessor or microcontroller of the central processing unit (1) governs all the interactions with the various elements, especially the sound-type interfaces (2) and inductive-type interfaces (3), as well as the sensors or actuators (4, 5, 6).

On the other hand, there is no direct interaction between these various elements.

According to the invention, the links between the central processing unit (1) and its various elements are electrical and formed, for example, by wires or by means of printed-circuit conducting tracks.

The microprocessor of the central processing unit (1) receives analogue signals from the sensor (6) and logic or analogue signals from the sensors (4), (3) and (2). The central processing unit (1) is therefore equipped, on the input side, with analogue/digital converters for these signals.

The central processing unit (1) emits a logic or analogue power signal towards the actuator (5) and analogue signals towards the interfaces (2) and (3). The central unit (1) is therefore equipped, on the output side, with digital/analogue converters.

The link between the child (7) and the microphone/loudspeaker (2) is a sound link and transmits sounds, noises, musical notes and words.

The link between the couplers (3, 12, 13) and the inductive labels (8) is of the inductive type and transmits bits of data.

The child (7) handles the accessories containing the labels (8) and plays with the toy containing the central processing unit (1). The interactions are physical, mechanical and acoustic.

If the central processing unit (1) is provided with optical sensors, the interactions may be visual and optical.

The software implanted into the memory associated with the microprocessor (1) defines and synchronizes the interactions and reactions of the toy with the child and the accessories, depending on the nature of the toy.

The electronic circuit applied to toys according to the invention equips, for example, a doll or a baby. The labels (8) are distributed within all the accessories, clothes, pushchairs, cradle, bath, etc.

The doll interacts with the child and with the accessories according to programmed scenarios, instructs a dialogue, recognizes the child by tone of voice, reacts to the manipulation and to those of the accessories, reacts to touching, opens and closes the eyelids at appropriate moments etc.

The dialogue is, for example, synchronized to the perception of the child's tone of voice.

The manipulation is detected by switch contactors (6) and by the gravimetric sensor (4).

The opening of the eyelids is governed by an electromagnet.

The doll identifies the accessories after an identification-code exchange between the inductive coupler (3) and the inductive label (8) incorporated into the accessory, as has already been mentioned. Consequently, the doll reacts to its environment and to the interventions by the child. It can also invite the child to play a game requiring the accessories, and can control the proper use thereof.

The extreme abundance of the possible interactions does not, of course, allow an exhaustive description, these interactions not constituting the fundamental characteristics of the invention.

In one embodiment, the electronic system according to the invention equips a children's kitchen. The labels (8) are placed in the crokery and saucepans. The sound effects (for example of cooking) are synchronized with respect to the child's actions, etc.

In another application, the electronic system according to the invention equips a workbench or workshop, again for a child. The inductive labels (8) are then incorporated into the tools. A dialogue can be learnt based on an imaginary or real do-it-yourself job.

According to another application, the electronic system according to the invention may equip a garage or a motor-vehicle circuit, the inductive labels (8) being incorporated into the vehicles. The sound effects and dialogue are adapted to the movement of the vehicles.

In another application, the electronic system according to the invention equips a representation of scenery, a mountain, a farm, a work of art, a construction, etc., on the child's scale. The inductive labels (8) are placed in the characters and animals, the sound effects identify the animals and the scenarios are recounted to the child interactively with his hand movements.

In one version of the invention, the central processing unit (1) incorporates a system preventing any collision of information during the execution of interactions between toy and accessories.

According to another version of the invention, the central processing unit includes a system for the multiple recognition and identification of information, in such a way as to allow sequential or simultaneous reading of several inductive labels lying within the reading field of the inductive coupler.

According to the invention, the interactivity and the intelligence of the tool stem from the sophistication of its program. For each application—doll, kitchen, garage, etc.—specific software is stored in the memory associated with the central processing unit (1) and, for each application, both a specific architecture and a sensor distribution are defined.

According to a more developed version of the invention, the software is modular and interchangeable. To do this, it is linked to a microcomputer.

For this purpose, a modem-type connection—either serial or parallel—connection to the electronic circuit of the central processing unit is provided. The link to the computer is then provided after connecting the serial or parallel modem line and therefore allows any intervention with the contents of the programming.

The great benefit of the advice according to the invention may thus be recognized, which, because of the large number of possible interactions, means that the applications, especially for play, of the toys are infinitely variable.

What is claimed is:

1. A toy comprising a toy proper and a plurality of accessories, comprising:
   at least one processing unit comprising at least one of a microprocessor and a microcontroller incorporated into the toy proper;
   an autonomous electrical supply for supplying said at least one processing unit with electrical energy;
   an assembly of at least one of a sensor and an actuator connected to interfaces integrated into said at least one processing unit for carrying out at least one type of function;
   at least one inductive coupler connected to said at least one processing unit; and
   wherein each of the plurality of accessories comprises at least one inductive label for interacting electromagnetically with said inductive coupler so that a current of defined frequency flows through said at least one inductive coupler connected to said at least one processing unit and said at least one inductive coupler exchanges with said at least one inductive label binary data corresponding to at least one of a phase and an amplitude state of the frequency modulation.

2. The toy of claim 1 wherein said at least one processing unit is controlled by software which defines said at least one type of function in terms of behaviour and of interactions of the toy proper.

3. The toy of claim 1 wherein the toy proper further comprises a sound transducer connected to said at least one processing unit.

4. The toy of claim 1 wherein said at least one processing unit includes a device for multiple recognition and identification of information to allow at least one of a sequential and a simultaneous reading of said at least one inductive label disposed within a reading field of said at least one inductive coupler.

5. The toy of claim 1 wherein said at least one processing unit includes a device for recognition and identification of information to allow at least on of binary and hexadecimal information to be written into said one or more inductive labels disposed within a reading field of said inductive coupler.

6. The toy of claim 1 wherein the toy proper comprises at least one of a doll and a baby, and wherein the plurality of accessories comprise at least one of clothes, furniture, toilet articles, and kitchen articles.

7. The toy of claim 1 wherein the toy proper comprises a child's kitchen, and wherein the plurality of accessories comprise crockery and saucepans.

8. The toy of claim 1 wherein the toy proper comprises at least one of a child's workbench and a do-it-yourself workshop, and wherein the plurality of accessories comprise a plurality of tools.

9. The toy of claim 1 wherein the toy proper comprises at least one of a scenery, a work of art, and a construction, and wherein the plurality of accessories comprises at least one of a plurality of animals and a plurality of characters.

10. The toy of claim 1 wherein the toy proper comprises at least one of a child's garage and a motor-vehicle circuit, and wherein the plurality of accessories comprise a plurality of vehicles.

* * * * *

UNITED STATES PATENT AND TRADEMARK OFFICE
CERTIFICATE OF CORRECTION

PATENT NO.    : 6,471,565 B2
DATED         : October 29, 2002
INVENTOR(S)   : Simeray It is certified that error appears in the above-identified patent and that said Letters Patent is hereby corrected as shown below:

Column 6,
Line 33, delete the word "on" and insert -- one --

Signed and Sealed this

Fourth Day of March, 2003

JAMES E. ROGAN
*Director of the United States Patent and Trademark Office*